(12) United States Patent
Olsen et al.

(10) Patent No.: US 7,677,668 B2
(45) Date of Patent: Mar. 16, 2010

(54) VEHICLE SEATS HAVING A BACK SUPPORT LOCK ASSEMBLY

(75) Inventors: Donald J. Olsen, Greenville, MI (US); Lee Mankel, Caledonia, MI (US); Kevin Downey, Grand Rapids, MI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 11/971,002

(22) Filed: Jan. 8, 2008

(65) Prior Publication Data

US 2009/0174235 A1    Jul. 9, 2009

(51) Int. Cl.
*B60N 2/20*    (2006.01)
(52) U.S. Cl. .................................. 297/378.14
(58) Field of Classification Search ............ 297/378.14, 297/378.12, 378.1, 341, 340
See application file for complete search history.

(56) References Cited

U.S. PATENT DOCUMENTS

| | | | |
|---|---|---|---|
| 3,054,637 A * | 9/1962 | Pambello | ........................ 297/4 |
| 4,474,407 A | 10/1984 | Nazar | |
| 4,500,059 A | 2/1985 | Papizan | |
| 4,544,205 A | 10/1985 | Molnar | |
| 4,715,652 A | 12/1987 | Ward | |
| 4,775,187 A | 10/1988 | Herr | |
| 4,861,104 A | 8/1989 | Malak | |
| 4,887,379 A | 12/1989 | Harrison | |
| 5,052,325 A | 10/1991 | Rhines | |
| 5,067,773 A | 11/1991 | Koa | |
| 5,069,503 A * | 12/1991 | Martinez | ...................... 297/54 |
| 5,188,442 A * | 2/1993 | Harty et al. | ............. 297/188.11 |
| D345,865 S | 4/1994 | Tintori | |
| 5,452,940 A | 9/1995 | Maier | |
| D388,966 S | 1/1998 | Beermann et al. | |
| D395,558 S | 6/1998 | Gryp et al. | |
| 5,758,924 A | 6/1998 | Vishey | |
| 5,820,221 A | 10/1998 | Greaves et al. | |
| 5,895,096 A | 4/1999 | Massara | |
| 5,951,110 A | 9/1999 | Conner et al. | |
| 5,967,602 A | 10/1999 | Ptak et al. | |
| 5,992,936 A | 11/1999 | Greaves | |
| 6,003,937 A | 12/1999 | Dutton et al. | |
| 6,010,195 A | 1/2000 | Masters et al. | |
| D420,816 S | 2/2000 | Wilcox et al. | |
| 6,042,180 A | 3/2000 | Lombardi | |
| D431,943 S | 10/2000 | Lee | |
| D432,823 S | 10/2000 | Zheng | |
| 6,164,724 A | 12/2000 | Greaves | |
| 6,168,239 B1 | 1/2001 | Conner et al. | |
| 6,213,557 B1 | 4/2001 | Aebischer et al. | |

(Continued)

FOREIGN PATENT DOCUMENTS

JP    200433267    2/2004

*Primary Examiner*—Milton Nelson, Jr.
(74) *Attorney, Agent, or Firm*—Hanley, Flight & Zimmerman, LLC (57) ABSTRACT

Vehicle seats having a back support lock assembly are disclosed. An example vehicle seat includes a seat bottom and a back support pivotally coupled to the seat bottom. The example vehicle seat also includes a lock assembly having a locking lever rotatably coupled to the back support, wherein the locking lever has an end to engage a surface of the seat bottom to lock the back support in a folded position relative to the seat bottom.

18 Claims, 9 Drawing Sheets

U.S. PATENT DOCUMENTS

| | | |
|---|---|---|
| D451,715 S | 12/2001 | Tseng |
| D453,078 S | 1/2002 | Yamazaki et al. |
| 6,357,830 B1 | 3/2002 | Ratza et al. |
| 6,390,547 B1 | 5/2002 | Spykerman |
| 6,394,545 B2 | 5/2002 | Knoblock et al. |
| D468,939 S | 1/2003 | Zheng |
| 6,513,876 B1 * | 2/2003 | Agler et al. ............ 297/378.14 |
| D471,743 S | 3/2003 | Chen |
| D473,390 S | 4/2003 | Hannon et al. |
| 6,565,153 B2 | 5/2003 | Hensel et al. |
| RE38,302 E | 11/2003 | Rieger |
| 6,644,751 B2 | 11/2003 | Ratza et al. |
| 6,648,419 B2 | 11/2003 | Ratza et al. |
| 6,688,686 B1 | 2/2004 | McEvoy et al. |
| 6,739,280 B2 | 5/2004 | Keller |
| D502,610 S | 3/2005 | Murphy |
| 6,880,215 B2 | 4/2005 | Peterson |
| D504,579 S | 5/2005 | Beermann et al. |
| D506,084 S | 6/2005 | Beermann et al. |
| D508,337 S | 8/2005 | Stalmate et al. |
| D508,807 S | 8/2005 | Berger |
| D509,077 S | 9/2005 | Beermann et al. |
| 6,986,550 B2 | 1/2006 | Gevaert et al. |
| D531,420 S | 11/2006 | Kita |
| D534,005 S | 12/2006 | Beermann |
| D534,747 S | 1/2007 | True |
| D535,839 S | 1/2007 | Johnson |
| D536,185 S | 2/2007 | Ritzel |
| D536,201 S | 2/2007 | Egger |
| D536,543 S | 2/2007 | Hsu |
| D536,554 S | 2/2007 | True |
| D536,887 S | 2/2007 | Goebert et al. |
| 7,229,132 B2 * | 6/2007 | Meeker et al. ........... 297/250.1 |
| 2002/0145314 A1 | 10/2002 | Kucera |
| 2005/0168041 A1 | 8/2005 | Glance et al. |
| 2006/0170274 A1 | 8/2006 | Moule |
| 2006/0244301 A1 | 11/2006 | Jeffries |
| 2007/0040440 A1 | 2/2007 | Kircher et al. |

* cited by examiner

VEHICLE SEATS HAVING A BACK SUPPORT LOCK ASSEMBLY

FIELD OF THE DISCLOSURE

The present disclosure relates generally to vehicle seats, more specifically, to vehicle seats having a back support lock assembly.

BACKGROUND

Various types of seats have been developed for different vehicles across many industries. For example, recreational boating has prompted the development of pedestal-style seats where the seat is supported on a pedestal above a boat surface such as the boat deck. Many conventional vehicle seats such as the pedestal-style seats used in the boating industry do not include foldable back supports. Consequently, the surface of the seats cannot be readily protected from rain or other adverse weather conditions. In addition, vehicle seats having back supports that cannot be folded down for storage also create significantly more wind resistance when the vehicle is being towed on a trailer.

BRIEF DESCRIPTION OF THE DRAWINGS

Like components are identified by like numbers throughout the specification. Not all features and components are shown in each figure. All of the components in each figure may not be drawn to scale.

DETAILED DESCRIPTION

Figure 1A:
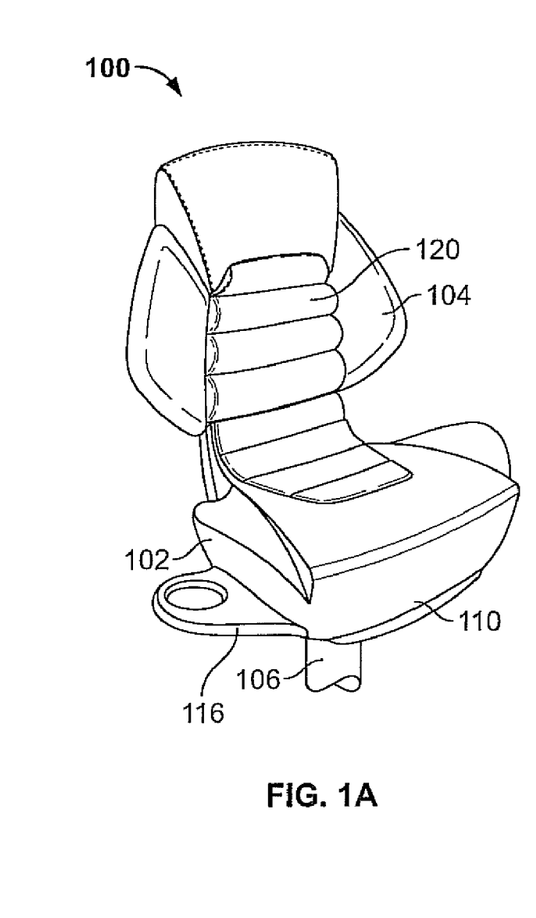
FIG. 1A is a front view of an example seat in an unfolded or operating position.
Figure 1B:
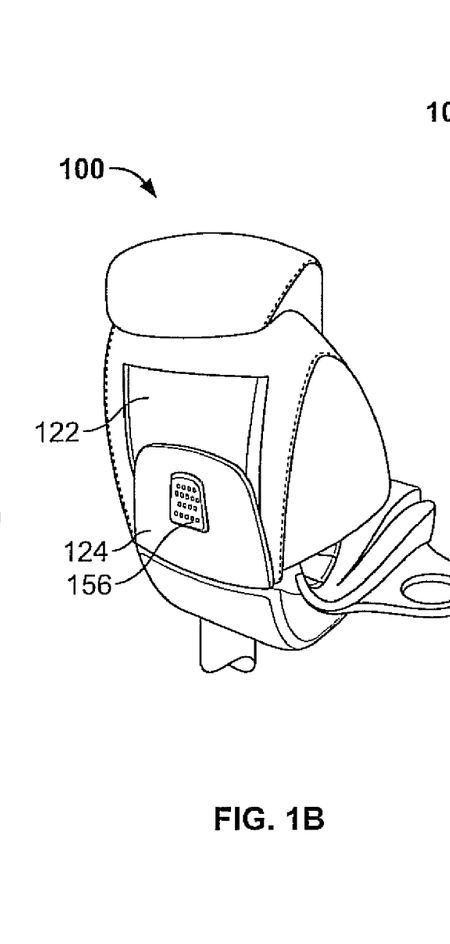
FIG. 1B is a rear view of the example seat of FIG. 1A.

FIG. 1A depicts an example vehicle seat 100 that may be used, for example, in a recreational boat. The example seat 100 includes a weight support or seat bottom 102 and a back support 104. The seat bottom 102 is attached to the surface of a vehicle by, for example, a pedestal 106, though any known fastening means and supporting means may be used instead of or in addition to the pedestal 106. In various alternative examples, the seat bottom 102 may have a plain front portion 110 (FIG. 1A) or may include one or more other features including for example, a sliding drawer 112 (FIG. 1C), a mesh storage unit 114 (FIG. 1D), a cup holder 116 (FIG. 1A) and/or one or more integrally molded handle(s) 118 (FIG. 1D). The back support 104 may also include one or more additional features such as, for example, an onsert support 120 (FIGS. 1A and 1C), a back pocket 122 and/or a back cover 124 (FIG. 1B). In addition, the seat bottom 102 and the back support 104 may include various contours, recesses, ridges, flanges, etc. to create a variety of distinct shapes and profiles as shown in FIGS. 1A-D, 8A-H and 9A-D, in various examples. Further, the various components of the seat bottom 102 and the back support 104 may be interchanged to enable the vehicle seat 100 to be configured to provide an appearance or aesthetic characteristics desired by a user, a supplier, etc.

Figure 1C:
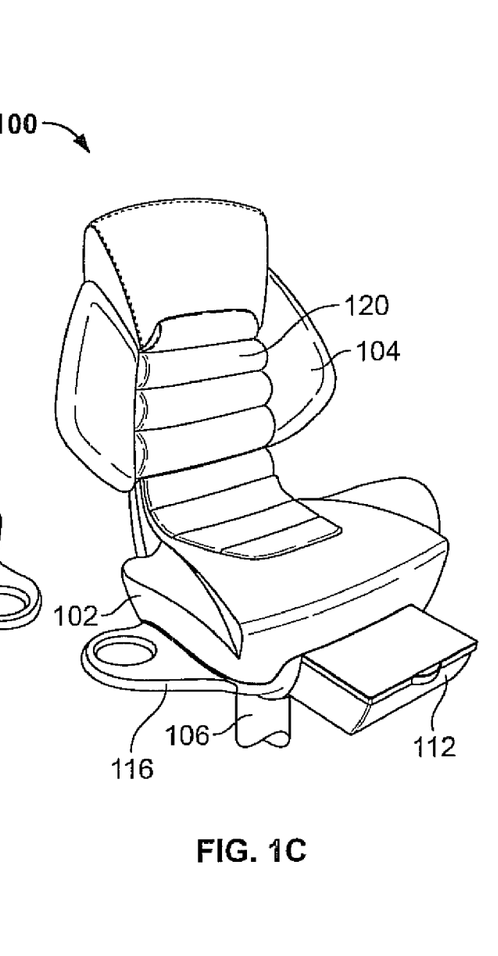
FIG. 1C is a front view of the example seat of FIG. 1A including an example sliding drawer.
Figure 1D:
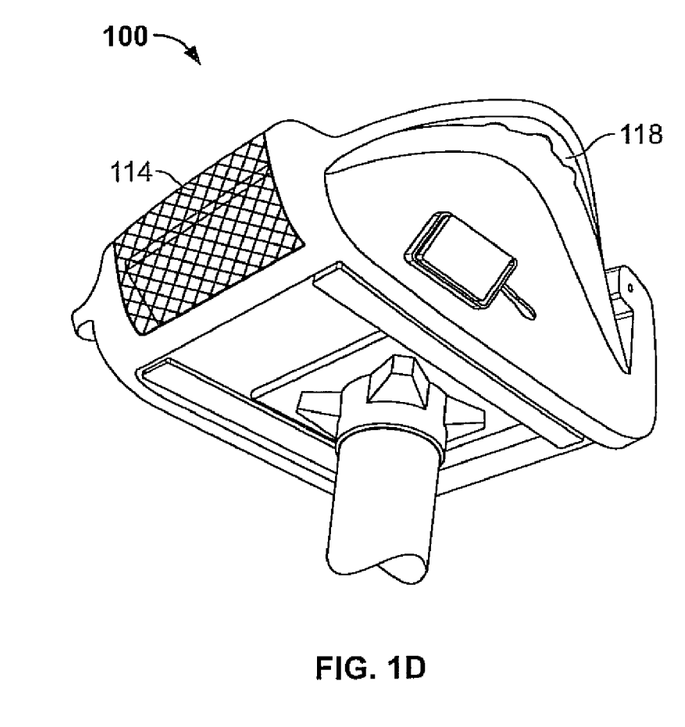
FIG. 1D is a front, bottom view of a portion of the example seat of FIG. 1A including an example mesh storage unit.

When the example seat 100 is in the unfolded position as shown in FIGS. 1A-C, the back support 104 is upright, and the lock assembly 148 indicates that the back support 104 is not in the locked position. This indication may be presented by the position of the lock assembly 148 as described in greater detail below.

Figure 2:
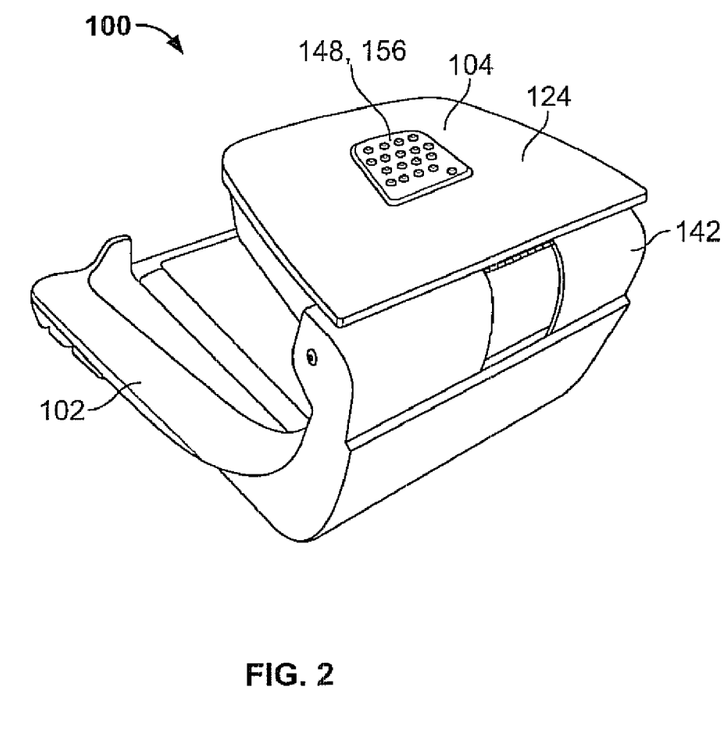
FIG. 2 is a rear view of a portion the example seat of FIG. 1A in a folded position.

To lock the back support 104 in the folded position, the lock assembly 148 is actuated, and the back support 104 is folded downward. With the seat 100 in the locked position, the seat back 104 substantially covers the seat bottom 102 so that the front surface of the back support 104 and the top surface of the seat bottom 102 are concealed or protected from the surrounding environment. Thus, in the folded position, the back support 104 and the seat bottom 102 are protected from rain, snow and other environmental conditions. In addition, if the vehicle in which the seat 100 is disposed is placed on a trailer and towed by another or secondary vehicle, or the vehicle is otherwise traveling, the back support 104 is positioned such that there is less surface area exposed in the direction of travel and, therefore, less wind resistance is generated by the seat 100. Such decreased wind resistance has many benefits including, for example, greater maneuverability and an increase in gas mileage for a vehicle in which the seat 100 is disposed or a secondary vehicle towing such a vehicle.

Figure 3:
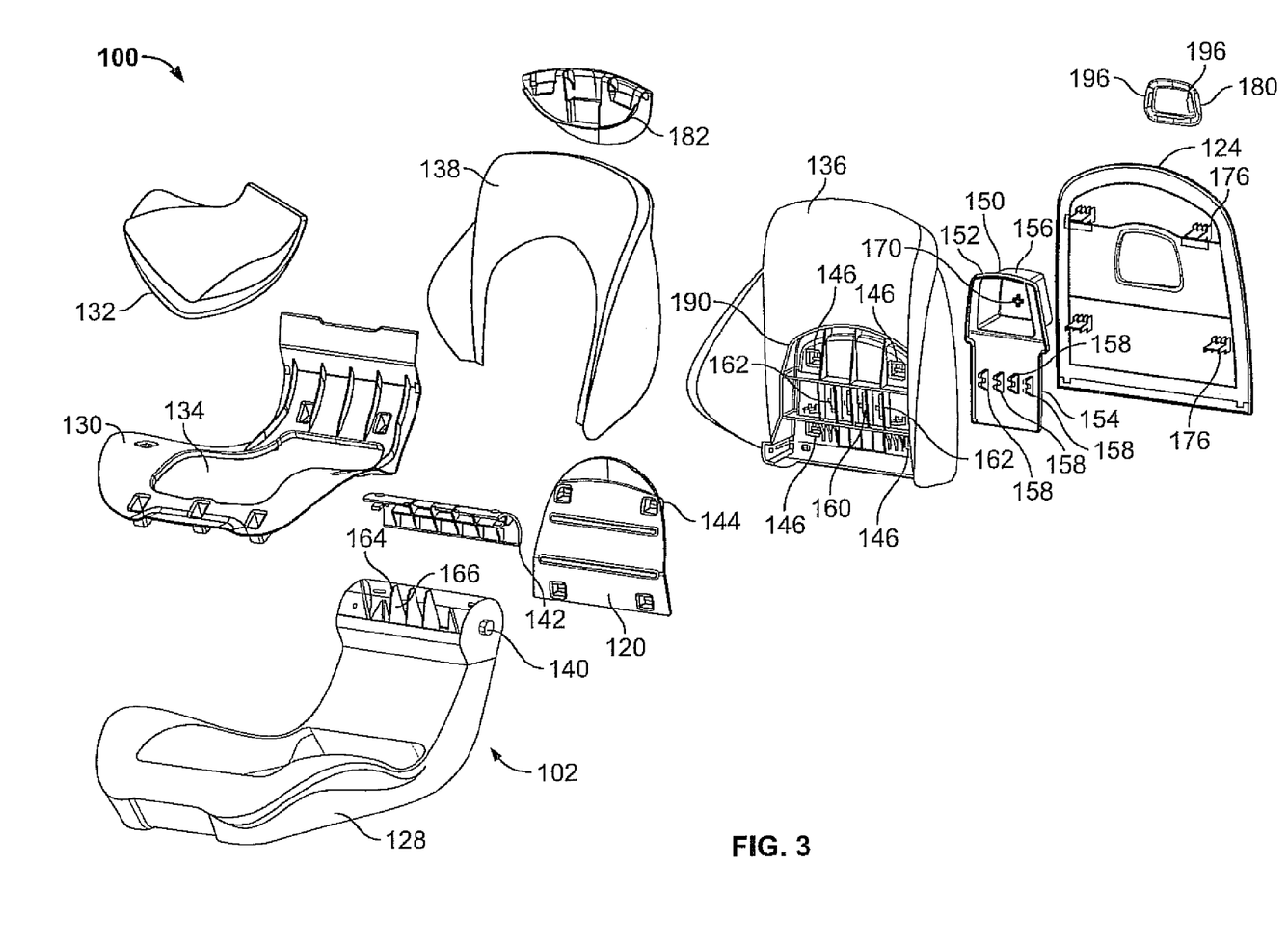
FIG. 3 is an exploded partial assembly of the example seat of FIG. 1A.

FIG. 3 depicts an exploded partial assembly view of the example vehicle seat 100 of FIG. 1A. The seat bottom 102 includes a seat pan core 128, seat pan substrate 130 and seat bottom foam 132. The seat pan core 128 is couplable to the pedestal 106 or other support structure. The seat pan core 128 also includes various contours to contribute to the overall profile and shape of the seat, as described above and shown in the variations illustrated throughout the figures. The seat pan core 128 may further include the drawer 112, the mesh support 114, the cupholder 116 and/or the handle(s) 118, in some examples. In addition, the seat pan core 128 supports the seat pan substrate 130, which may be coupled to the seat pan core 128 via any suitable combination of mechanical and/or chemical fasteners.

The seat pan substrate 130 provides the base or frame to which the seat bottom foam 132 is coupled. The seat bottom foam 132 may be an injection molded foam, a foam molded with poly film, or any other soft material to provide cushioning to an occupant of the seat 100. The seat bottom foam 132 may be upholstered, adhered or otherwise fastened to the seat pan substrate 130 prior to assembling the seat pan substrate 130 to the seat pan core 128. Coupling the seat bottom foam 132 to the seat pan substrate 130 prior to assembly with the seat pan core 128 decreases the time needed to upholster the seat 100 and decreases overall manufacturing time and, thus, the costs associated therewith.

In addition, the seat pan substrate 130 may include an opening 134 that enables the seat bottom foam 132 to provide suspension and/or a shock absorbing cushioning effect for an occupant of the seat 100. The example shock-absorbing seat 100 that includes the cushion member or seat bottom foam 132, which is shaped to support a seated user on an upper surface thereof, and the seat pan substrate 130 may also or alternatively include several features for further or alternative suspension and/or shock absorption. For example, the seat pan substrate 130 may include a front portion with a connector, a raised rear portion, and a recessed base portion shaped to position the seat bottom foam 132 thereover. The seat 100 may also include a shock-absorbing member positioned over the recessed base portion. The shock-absorbing member may include a deck supporting the seat bottom foam 132 on an upper side thereof and may include a rear attachment portion and a front attachment portion mounted to the connector of the front portion of the seat pan substrate 130. The shock-absorbing member may also include a plurality of longitudinally extensible spring members (not shown) having forward and rearward ends, a plurality of spring bosses (not shown) molded integrally in the raised rear portion of the seat pan substrate 130 to define apertures extending in a fore-to-aft direction and which receive therethrough the rearward ends of the spring members, and a connector rod (not shown) extending along a back area of the raised portion of the seat pan substrate 130. The connector may be connected to the rearward ends of the spring members to support the deck in a pre-tensed condition over the recessed base portion of the seat pan substrate 130 for absorbing shock loading applied to the seat 100 by the seated user.

The back support 104 includes a back substrate 136 to which a seat back foam 138 may be fastened. The seat back foam 138 may be fastened to the back substrate 136 in a manner similar to the coupling of the seat bottom foam 132 to the seat substrate 130 and prior to the coupling of the seat back cover 124. Coupling the seat back foam 138 to the back substrate 136 prior to assembly with the seat back cover 124 decreases the time needed to upholster the seat 100 and decreases overall manufacturing time and, thus, the costs associated therewith.

In the illustrated example, a hinge assembly 140 is used to couple the seat bottom 102 and the back support 104. Any type of hinge assembly may be used. The seat 100 also includes a seat pan cover 142 that covers the top portion of the seat bottom 102. The seat pan cover 142 may be at least partially concealed by the bottom of the back support 104.

The onsert support 120 (shown unupholstered) may be coupled to the front of the back substrate 136 to provide, for example, lumbar support. In the illustrated example, the onsert support 120 includes extensions 144 that engage recesses 146 in the back substrate 136. In the illustrated examples, the extensions 144 are inserted and pressed into the recesses 146 in a snap-fit manner. However, any known mechanical or chemical fastening means may be used such as, for example, screws, tabs, pressure-fit, Velcro strips, ties, etc., or any combination thereof. The onsert support 120 may be upholstered prior to the fastening of the onsert support 120 to the back substrate 136. Upholstering the onsert support 120 prior to coupling the onsert support 120 to the back support 104 decreases the time it takes to upholster the onsert support 120 and decreases overall manufacturing time and, thus, the costs associated therewith. Furthermore, the onsert support 120 is interchangeable because the onsert support 120 may be easily removed from the seat 100 by, for example, pulling the onsert support 120 to disengage the extensions 144 from the recesses 146 or otherwise unfastening any mechanical or chemical fasteners used engage the onsert support 120 to the seat back 104 to cause the onsert support 120 to disengage from the seat back 104. In addition, the onsert support 120 may be customized. In particular, the onsert support 120 may be upholstered with any suitable material including, for example, mesh, vinyl, plastic, etc., and the onsert support 120 may be contoured, injection molded or otherwise formed to have any desired shape or contour(s).

Figure 4:
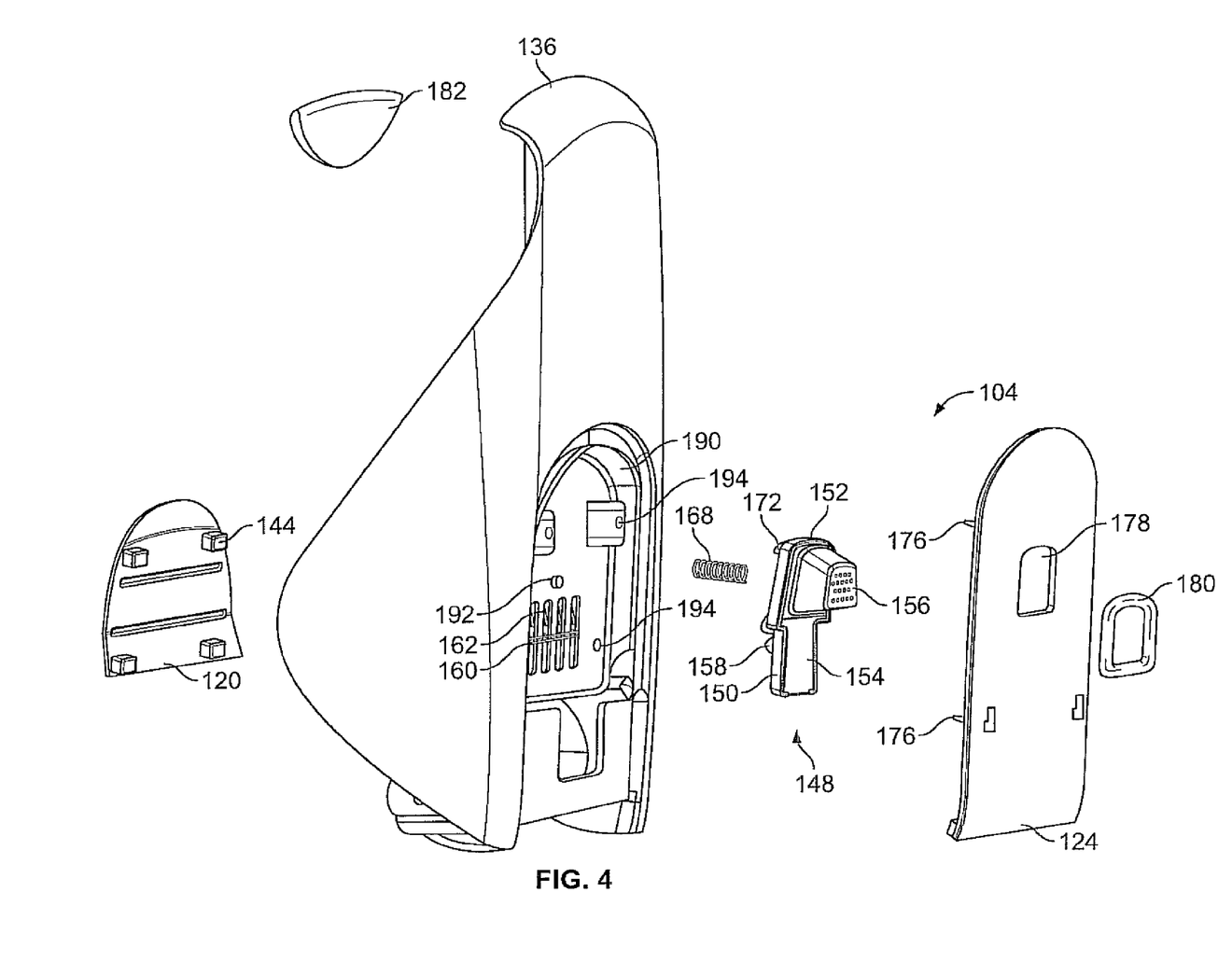
FIG. 4 is another exploded partial assembly of the example back support of the example seat of FIG. 1A.

FIG. 4 is another exploded partial assembly of the example back support 104 of the example seat 100 showing portions of the lock assembly 148. The lock assembly 148 includes a locking lever 150. The locking lever 150 has a first end 152 and a second end or engaging portion 154. The first end 152 of the locking lever 150 includes an actuating portion or button 156 that extends outwardly from the locking lever 150. The actuating button 156 may be formed as a flat button or extended structure, a handle, a tab or any other shape. The actuating button 156 is actuated by a user to move the locking lever 150 to lock/unlock the back support 104 from the seat bottom 102 as described in greater detail below. The locking lever 150 also includes one or more retainers 158. The retainers 158 fasten the locking lever 150 to a pivot bar 160 disposed on the back substrate 136 in, for example, an internal cavity 190. The retainers 158 traverse one or more slots 162 in the back substrate 136 when engaged to the pivot bar 160. In the illustrated example, the retainers 158 are u-shaped clasps, though any fastening means to pivotably or rotatably fasten the locking lever 150 to the pivot bar 160 may be used instead. Further, though the illustrated example shows four retainers 158 and four slots 162, any number of retainers and/or slots may be used instead. In addition, the retainers 158 and/or slots 162 may be of varying shapes and dimensions.

Figure 5:
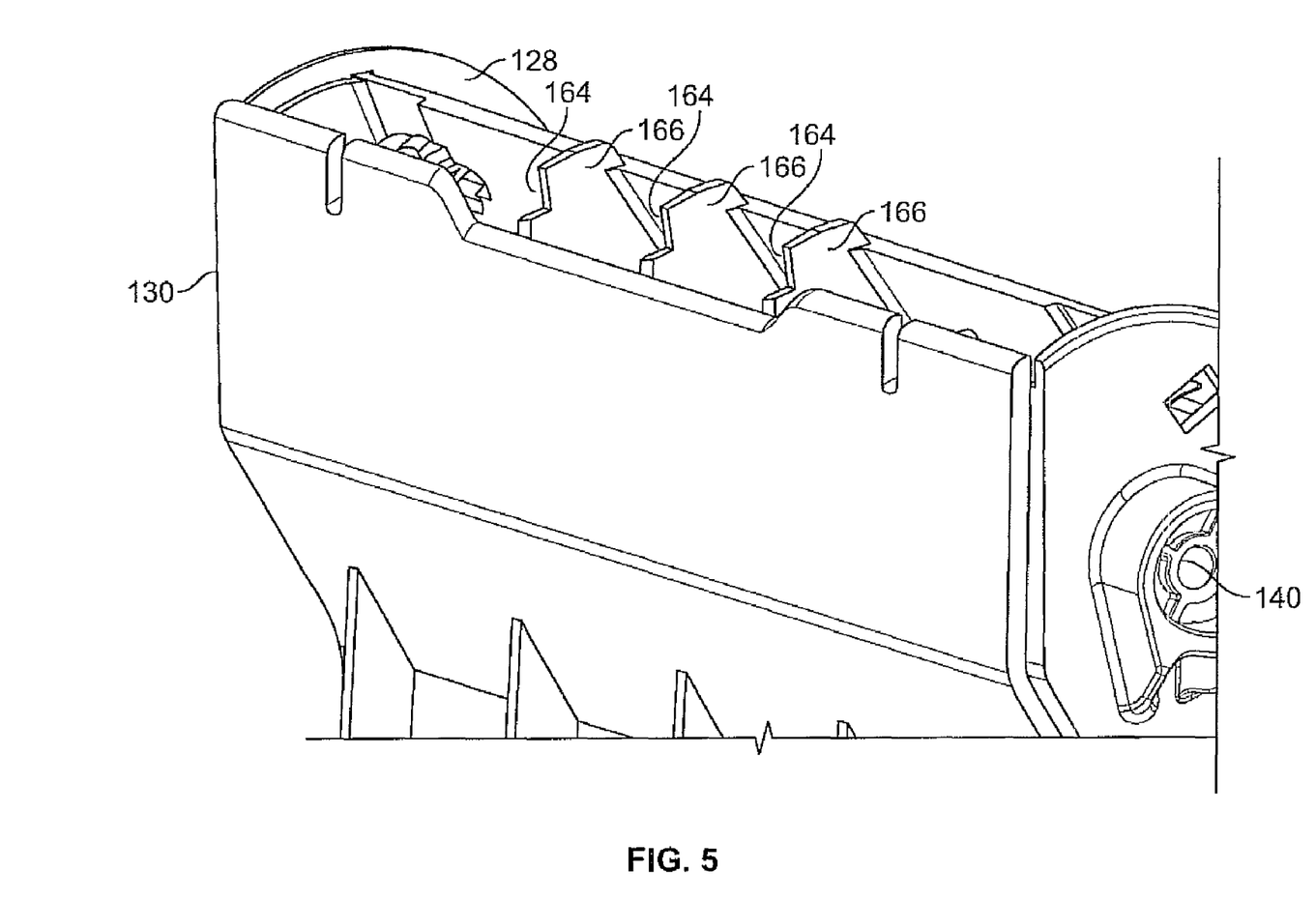
FIG. 5 is an enlarged perspective view of a top portion of the example seat of FIG. 1A.
Figure 6:
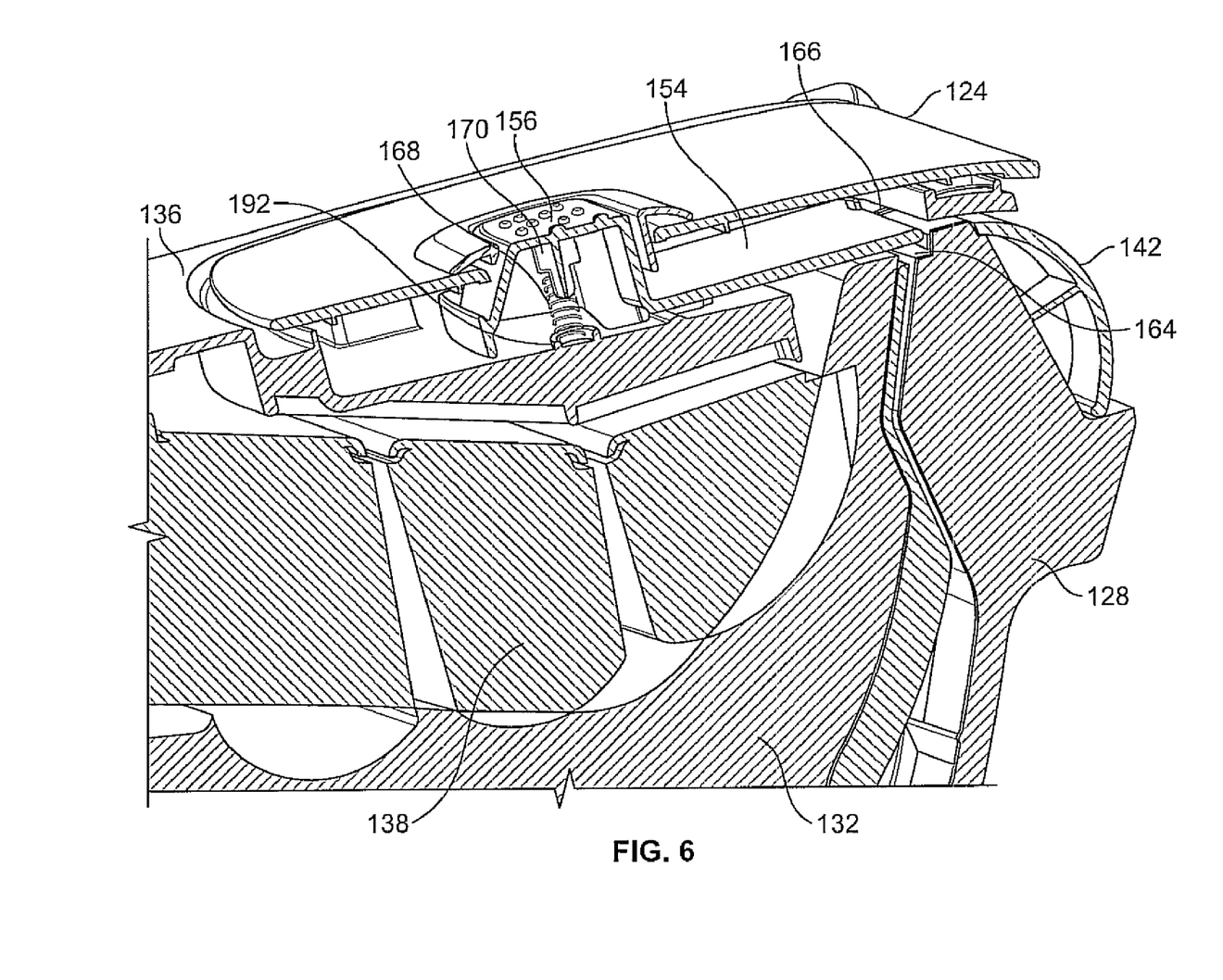
FIG. 6 is a cross-sectional view of a portion of the example seat of FIG. 1A in a folded position.

The second end 154 of the locking lever 150 may engage one or more surfaces or notches 164 disposed on one or more ribs or ridges 166 formed on or in or coupled to the seat pan core 128 (FIGS. 3, 5 and 6). The illustrated example shows three notches 164 on three ridges 166, though any number of notches and ridges may be used instead. To lock the seat 100 in the folded position, the seat back portion 104 is pushed from an upright and opened or operational position down to the folded position in which the back support 104 is located over and is substantially parallel to the seat bottom 102. In the folded position, the second end 154 of the locking lever 150 engages the notches 164 and a spring or biasing member 168 pushes the second end 152 of the locking lever 150 away from the back substrate 136 to cause the locking lever 150 to rotate about the pivot bar 160 and to maintain the engagement of the second end 154 with the notches 164. If the back support 104 is pulled upward from the folded locked position without operating the actuating button 156, the second end 154 of the locking lever 150 engages further with the notches 164 to prevent the back support 104 from being raised to its open or upright position.

To unlock the seat 100, the actuating button 156 is displaced or depressed (i.e., pushed toward the back substrate 136) to compress the spring 168, which is held in place by a strut 170 on the lock assembly 148 and a support post 192 on the back substrate 136. Depressing the actuating button 156 (and the first end 152 of the locking lever 150) causes the locking lever 150 to pivot about the pivot bar 160 and the second end 154 of the locking lever 150 to lift upward and out of engagement with the notches 164. Once the second end 154 of the locking lever 150 is disengaged from the notches 164, the back support 104 may be rotated about the hinges or hinge assembly 140 upward to the open or upright position. The locking lever 150 includes a stop 172 that may engage the rear side of the back substrate 136 to prevent the locking lever 150 from over rotating.

The back support 104 includes the back cover 124, which may be used to hide portions of the lock assembly 148 and substantially cover the interior cavity 190 of the back substrate 136 (FIGS. 3, 4 and 6). The back cover 124 includes a plurality of extensions 176 that engage corresponding recesses 194 on the back substrate 136. In the illustrated example the extensions 176 are inserted and pressed into the recesses 194 on the back substrate 136 in a snap-fit manner. However, any additional or different known mechanical or chemical fastening means may be used such as, for example, screws, tabs, pressure-fit, Velcro strips, ties, etc., or any combination thereof to couple the back cover 124 to the back substrate 136. In addition, the back cover 124 may be upholstered prior to fastening the back cover 124 to the back substrate 136. Upholstering the back cover 124 prior to coupling the back cover 124 with the back substrate 136 decreases the time it takes to upholster the back cover 124 and decreases manufacturing time and, thus, the costs associated therewith. Furthermore, the back cover 124 is interchangeable because the back cover 124 may be easily removed from the seat 100 by, for example, pulling the back cover 124 to disengage the extensions 176 from the recesses 194 or otherwise unfastening any mechanical or chemical fasteners used engage the back cover 124 to the seat substrate 136 to cause the back cover 124 to disengage the seat substrate 136.

The back cover 124 also includes an aperture 178 via which at least a portion of the lock assembly 148 traverses, protrudes or extends. In the illustrated example, the actuating button 156 protrudes through the aperture 178. The degree of protrusion of the lock assembly 148 through the aperture 178 may provide a visual indication of the state of the seat 100, i.e., whether the seat 100 is in the folded and locked or the upright open position.

Other features may be included with the example seat 100 including, for example, a bezel 180 that surrounds the aperture 178 to provide a clean trim. The bezel 180 includes one or more clips 196 that engage an interior side of the back cover 124. The seat 100 may also include an interchangeable head rest 182. The headrest 182 may include cushions of varying contour(s) and may be upholstered with various materials. FIG. 3 shows the example headrest 182 with no cushion, while the headrest 182 is shown with a cushion and/or upholstered in FIG. 4.

Figures 7A, 7B:
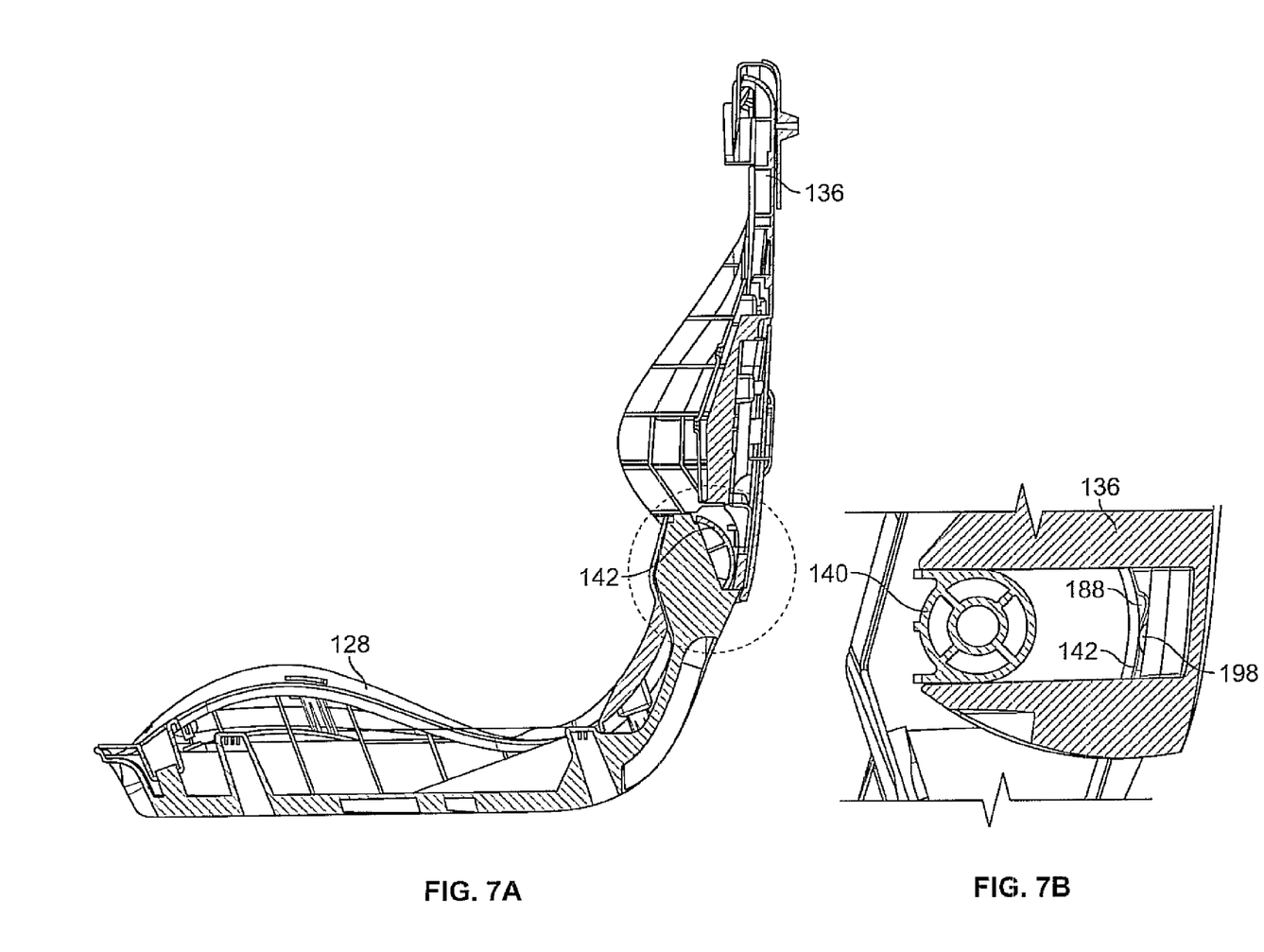
FIG. 7A is a partial cross-sectional view of a section of the example seat of FIG. 1A.
FIG. 7B is an enlarged cross-sectional view of the encircled area of FIG. 7A.
Figure 8A:
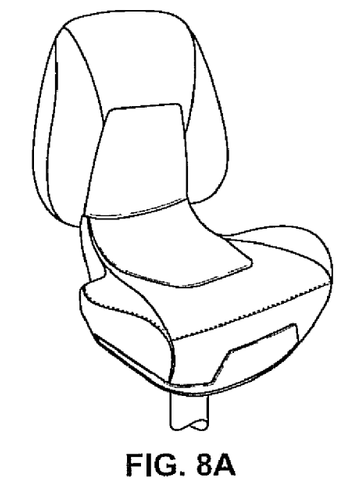
FIGS. 8A-8H show alternative example seats that may employ the example foldable back support described herein.
Figure 8B:
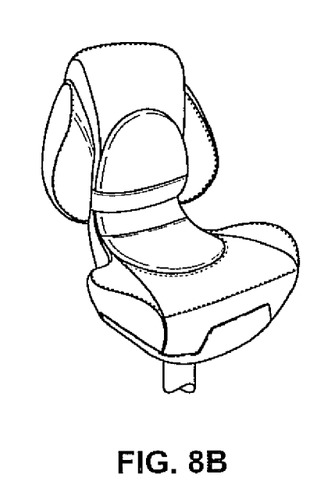
Figure 8C:
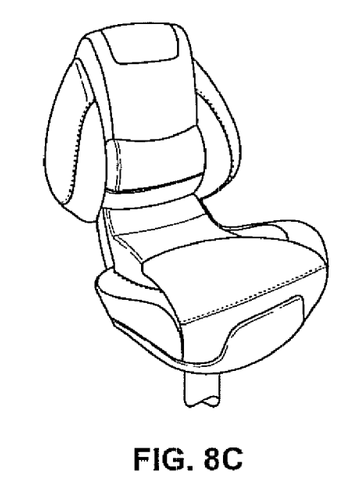
Figure 8D:
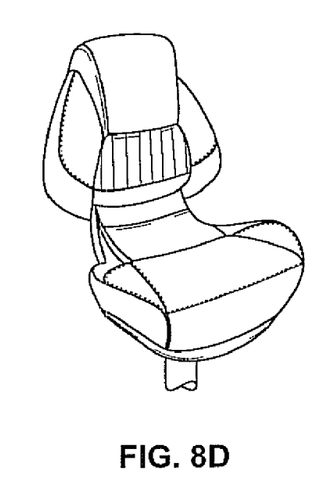
Figure 8E:
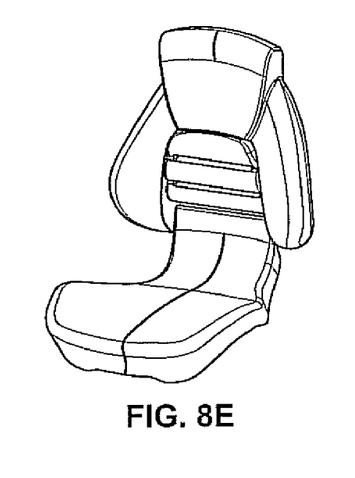
Figure 8F:
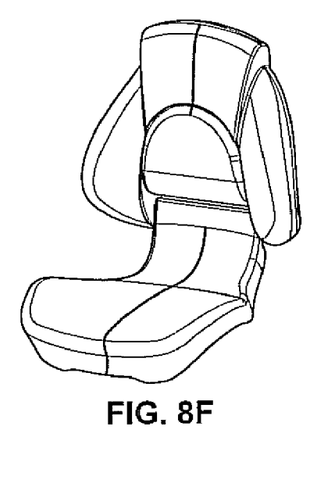
Figure 8G:
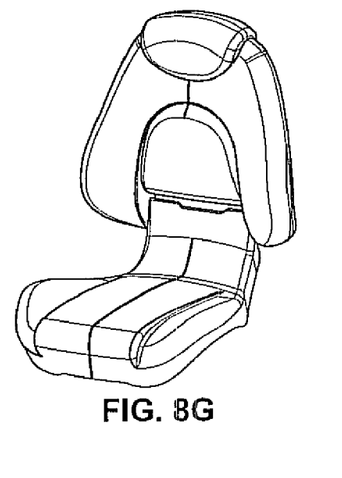
Figure 8H:
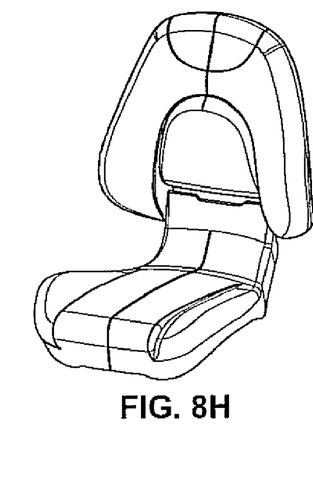
Figure 9A:
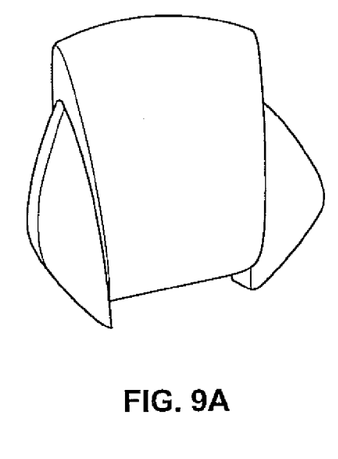
FIGS. 9A-9D show alternative example back supports.
Figure 9B:
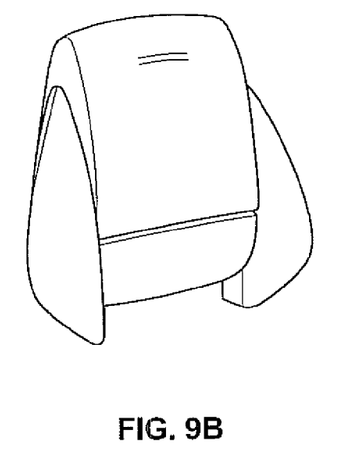
Figure 9C:
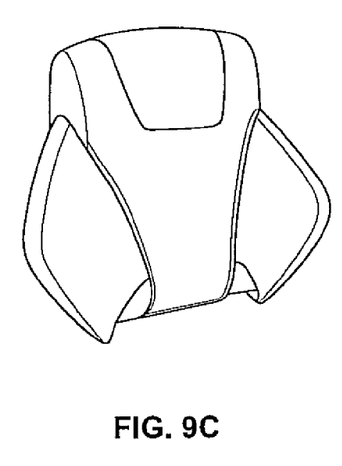
Figure 9D:
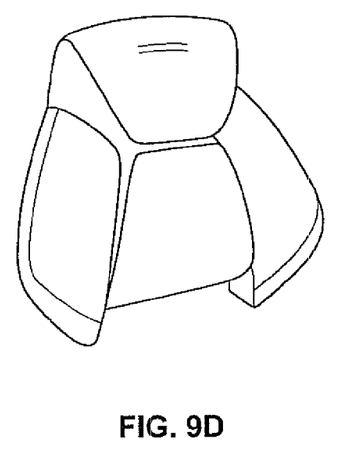

FIG. 7A is a partial cross-sectional view of a section of the example seat 100 of FIG. 1A, and FIG. 7B is an enlarged cross-sectional view of the encircled area of FIG. 7A. FIGS. 7A and 7B illustrate that the seat pan cover 142 includes one or more cover detents 188, and the seat back substrate 136 includes one or more back detents 198. The cover detents 188 and the back detents 198 align so that when the seat 100 is open and the back support 104 is in the upright position, the cover detents 188 and the back detents 198 engage. Engagement between the cover detents 188 and the back detents 198 provides a frictional engagement to maintain the back support 104 in the upright position. In use, a force sufficient to overcome the friction between the cover detents 188 and the back detents 198 may be exerted on the back support 104 to move the back support 104 from the open or upright position to the folded and locked position. In particular, to move the seat 100 into the folded and locked position, the back detents 198 may be pushed up and over the cover detents 188. As a result, a lock or latch to hold the back support 104 in an open or upright position may not be needed. Furthermore, when rotating the seat back support 104 from the folded and locked position to the open or upright position (i.e., after the lock assembly 148 has been actuated and the back support 104 is able to rotate relative to the seat bottom 102), the cover detents 188 and the back detents 198 become frictionally engaged. To bring the back support 104 to the upright position, the back detents 198 may be pushed downward and over the cover detents 188.

The example vehicle seat described herein is configured to provide a high degree of modularity (e.g., interchangeability of components) and, thus, a relatively high degree of application flexibility. In some examples, the above-described components may be configured to be removably coupled to one another. In this manner, a plurality of different combinations of components can be interchangeably coupled to change the aesthetics (e.g., color, shape, etc.) and/or functionality (e.g., size and/or position of the components) of the example vehicle seat to suit different applications and/or customer preferences. The various structural components of the example vehicle seat described herein may be made of one or more types of molded plastic materials to minimize the cost and/or weight of the vehicle seats. In particular, blow-molded plastic components having a hollow core may be particularly useful for producing such lightweight vehicle seats inexpensively.

In addition, in some examples, the seating surfaces of the example vehicle seats may be made of a substantially non-absorbent, water-permeable membrane such as, for example, a synthetic (e.g., plastic) mesh material. However, other suitable substantially non-absorbent, water-permeable materials could be used instead of or in addition to a plastic mesh material. Additionally, as described above, the seat bottom 102, the back support 104 and/or the onsert support 120 or portions thereof, may be upholstered or otherwise covered with fabric or other suitable material(s) to provide a desired aesthetic property, texture, functionality, etc.

Although certain apparatus and articles of manufacture have been described herein, the scope of coverage of this patent is not limited thereto. To the contrary, this patent covers all embodiments fairly falling within the scope of the appended claims either literally or under the doctrine of equivalents.

What is claimed is:

1. A vehicle seat, comprising:
    a seat bottom including a plurality of ridges;
    a back support pivotally coupled to the seat bottom; and
    a lock assembly having:
        a single locking lever coupled to the back support, wherein the locking lever has an end to simulataneously engage the plurality of ridges of the seat bottom to lock the back support in a folded position relative to the seat bottom, and
        a biasing member, wherein the biasing member urges the end of the locking lever to engage the plurality of ridges of the seat bottom when the back support is located over the seat bottom.

2. A vehicle seat as defined in claim 1, wherein the back support includes a pivot bar, and wherein the lock assembly includes at least one retainer to couple the lock assembly to the pivot bar.

3. A vehicle seat as defined in claim 1, wherein at least a portion of the lock assembly includes an actuating portion that passes through the back support.

4. A vehicle seat as defined in claim 1, wherein the lock assembly is rotatably coupled to the back support.

5. A vehicle seat as defined in claim 4, wherein the lock assembly includes a stop to prevent over rotation of the lock assembly.

6. A vehicle seat as defined in claim 1, wherein the back support is pivotally coupled to the seat bottom via a pivot and wherein the end of the locking lever engages the plurality of ridges of the seat bottom proximate the pivot.

7. A seat as defined in claim 1, wherein compression of the biasing member disengages the end of the locking lever from the seat bottom.

8. A vehicle seat as defined in claim 1, wherein the seat bottom includes a shock-absorbing member.

9. A vehicle seat as defined in claim 1, wherein the seat bottom includes a seat pan substrate to which upholstery is fastened prior to assemble of the vehicle seat.

10. A vehicle seat as defined in claim 1, wherein the back support includes a back substrate to which upholstery is fastened prior to assembly of the vehicle seat.

11. A vehicle seat as defined in claim 1, wherein the back support further includes a back cover and wherein at least a portion of the lock assembly traverses the back cover.

12. A vehicle seat as defined in claim 1, wherein the seat back is held in an upright position by one or more detents.

13. A vehicle seat as defined in claim 1, further comprising:
a pivot bar on the back support; and
one or more retainers associated with the lock assembly to engage the pivot bar, wherein the one or more retainers are disposed between the end of the locking lever and a second end of the locking lever, wherein a portion of the second end of the locking lever at least partially traverses through the back support,
wherein selective engagement of the end of the locking lever with the seat bottom substantially prevents movement of the back support.

14. A vehicle seat as defined in claim 1, wherein a second end of the locking lever is engaged to the back support via the biasing member.

15. A seat comprising:
means for supporting an occupant's weight including a plurality of ridges;
means for supporting the occupant's back; and
means for locking the means for supporting the occupant's back in a position relative to the means for supporting the occupant's weight, wherein the means for locking comprises means for coupling the means for locking to the means for supporting the occupant's back and means for selectively and simultaneously engaging the means for locking to the plurality of ridges of the means for supporting the occupant's weight along a central portion of the means for supporting the occupant's weight to lock the means for supporting the occupant's back in a folded position relative to the means for supporting an occupant's weight, and wherein the means for locking includes a biasing member, wherein the biasing member urges the means for locking to engage the plurality of ridges of the means for supporting an occupant's weight when the means for supporting the occupant's back is located over the means for supporting an occupant's weight.

16. A seat as defined in claim 15, wherein at least a portion of the means for locking at least partially traverses from the means for supporting the occupant's back.

17. A seat as defined in claim 15, wherein the means for locking provides a means for visually indicating a position of the seat.

18. A seat as defined in claim 15, wherein the means for locking are rotatably coupled to the means for supporting the occupant's back.

* * * * *